United States Patent [19]
Gallus

[11] 4,144,077
[45] Mar. 13, 1979

[54] HIGH TEMPERATURE CEMENT SYSTEM

[75] Inventor: Julius P. Gallus, Anaheim, Calif.

[73] Assignee: Union Oil Company of California, Brea, Calif.

[21] Appl. No.: 844,642

[22] Filed: Oct. 25, 1977

Related U.S. Application Data

[63] Continuation-in-part of Ser. No. 700,387, Jun. 28, 1976, Pat. No. 4,069,870.

[51] Int. Cl.$^2$ ............................ C04B 7/02; C04B 7/32
[52] U.S. Cl. ....................................... 106/97; 106/104
[58] Field of Search ................. 106/97, 104; 166/291, 166/292, 293

[56] References Cited

U.S. PATENT DOCUMENTS

| | | | |
|---|---|---|---|
| 2,609,882 | 9/1952 | Morgan et al. | 106/97 |
| 3,376,146 | 4/1968 | Mitchell | 106/97 |
| 3,794,504 | 2/1974 | Babcock | 106/97 |
| 4,043,828 | 8/1977 | Gaines | 106/97 |

*Primary Examiner*—James Poer
*Attorney, Agent, or Firm*—Richard C. Hartman; Dean Sandford; Daniel R. Farrell

[57] ABSTRACT

A high temperature cement system including a carbon-containing, low volatile material additive admixed with cement in proportions sufficient to provide a fixed carbon content of at least 0.02 weight percent. Additives include anthracite, calcined coke, uncalcined coke, burned oil shale and raw oil shale.

21 Claims, No Drawings

HIGH TEMPERATURE CEMENT SYSTEM

RELATED APPLICATIONS

This application is a continuation-in-part of copending application Ser. No. 700,387, filed June 28, 1976 now U.S. Pat. No. 4,069,870.

BACKGROUND OF THE INVENTION

This invention relates to cement compositions, and more particularly to cement compositions which, when hydrated and cured, form a cement mass having improved resistance to degradation when exposed to elevated temperatures.

In the drilling of wells, for example oil wells, wells penetrating sources of geothermal energy and the like, it is standard practice to utilize a cement to hold the well casing in position and to selectively block or plug portions of the strata through which the well extends so as to prevent the escape of undesirable fluid into the well bore or the loss of drilling muds and the like. When so used, the cement, as an aqueous slurry, is pumped into the annular space between the walls of the bore hole and the casing and permitted to cure so as to form a hardened mass which provides the reinforcing and plugging functions.

The cements utilized in drilling operations are formulated so as to be sufficiently slow setting to permit pumping and yet be sufficiently resistant to the elevated temperature and pressure conditions encountered in the wells. The American Petroleum Institute has promulgated specifications for testing cements to insure that they meet certain minimum requirements with respect to strength, permeability, settling time and the like. These cements are referred to as oil well cements.

To resist the temperatures and pressure normally encountered in wells, the oil well cements have been developed to provide the maximum physical properties under the severe temperature and pressure conditions encountered in relatively deep wells, such as oil wells. These cements are conventionally Portland-type cements to which have been added one or more various additives such as for example mica, flast furnace slag, alumina and various special reactive sands, which are designed to improve the mechanical strength and the thermal and chemical resistance of the set and hardened cement. Although satisfactory for conventional well operations, these cements have proven deficient particularly in the case of ultra-deep wells and geothermal wells where temperature in excess of 400° F. (200° C.) may be encountered. Under such conditions conventional cements quickly increase in porosity and lose compressive strength which may lead to a blowout. Such well blowouts are highly undesirable and can prove to be extremely dangerous, as well as costly to repair.

Accordingly, oil well cements, particularly those used in geothermal wells and in ultra deep wells, that is wells sunk to depths on the order of 25,000 feet or more, must have the ability to effectively maintain an adequate compressive strength and density and low porosity, even under high temperatures and pressures and in the presence of steam and hot brine. In addition, since the useful life of a typical well is measured in terms of 10 to 30 years, a good oil well cement must operate under the aforementioned severe conditions for a substantial period of time, preferably as long as the life of the well. However, recent studies have indicated that oil well cements presently in use have effective lives of on the order of 5 to 10 years when utilized in geothermal wells, it was noted that the strength and permeability of the oil well cement were seriously deteriorated in a period of as short as 4 years thus raising the possibility of a well blowout and increasing the frequency of replacement and maintenance.

SUMMARY OF THE INVENTION

The present invention resides in an improved high temperature cement system, which, when set and hardened, maintains an effective compressive strength, density and low permeability even under the severe conditions of high temperature and steam or high temperature brines of the type encountered in geothermal wells. The cement is mixed with water, pumped into the well, allowed to set and harden, and is otherwise handled in the usual manner for oil well cements. Thus no special handling or mixing of the cement or special training of personnel is required in order to achieve the benefits of the present invention.

More specifically the high temperature cement system of the present invention comprises a hardenable cement composition and an effective amount of a carbon-containing additive having a low volatile material content, preferably not more than 15 weight percent. The cement system when set and hardened exhibits resistance to high temperature deterioration of its compressive strength and permeability.

The cement system of the present invention is utilized by forming a slurry of the cement system, pumping or otherwise introducing the slurry into a form or confined space such as the annular space between a well casing and the walls of the bore hole, and the slurry to cure into a solid mass. The cement mass formed from the cement system of the present invention has an improved resistance to the retrogression of its physical characteristics at high temperatures particularly in the presence of geothermal steam and/or geothermal brine.

The carbon-containing additive may be incorporated in the cement during manufacture and bagging and thus the cement system may be delivered to the wellhead ready for use, thereby reducing handling and mixing problems that may be attendant with the use of separate additives. In addition to the foregoing advantages the cement composition of the present invention may be otherwise handled like a conventional oil well cement. Conventional cement additives normally mixed with or used with oil well cements may be incorporated in the cement system. These and other advantages and features of the present invention will become apparent from the following detailed description and as defined by the claims appended thereto.

DESCRIPTION OF THE INVENTION

It has been discovered that the density, compressive stength and permeability of cured cement compositions are less subject to retrogression over a period of time when the cement system, from which the cured cement mass is formed, includes carbon or a carboniferous material as an additive. Of particular interest is the ability of a cement mass formed from the cured cement system of the present invention to resist degradation of its structural properties when subjected to high temperatures, for example temperatures in excess of about 400° F. (about 200° C.) over a period of time. The cement system of the present invention is thus particularly useful as an oil well cement, especially for use in ultradeep wells and geothermal wells where the finished hardened cement mass is to be subjected to substantial pressure, high temperatures and hot fluids, such as steam and hot brine.

As used herein the term "cement system" is used to designate the cement and cement additives in dry form. The term "slurry" is used to denote the cement system when suspended in a liquid vehicle such as water or a mixture of oil and water. "Cement mass" designates the cement system in the set and hardened conditions In accordance with the present invention the cement system comprises cement with which is admixed a carbon-containing material as a cement additive to improve the ultimate high temperature properties of the set and hardened cement mass. The cement additive is selected from carbon-containing materials which have a low volatile material content. Thus, high carbon content materials such as anthracite coal, calcined and uncalcined coke, and the like, are used as cement additives in the present invention. In these materials the carbon content typically ranges from about 85 to about 95 percent. Low and intermediate carbon content materials, however, are also useful as cement additive. For example, burned oil shale having as low as 3 to 4 percent carbon and also raw oil shale having between about 10 and 30 percent carbon have been found to be useful as the carbon-containing additive of the cement system of this invention.

The carbon-containing cement additives used in the present invention are typified by having a low content of volatile material. Volatile material is used to designate lower boiling gases and liquids given off by the carbon-containing additive upon heating. For the purposes of this description, volatile material is determined in accordance with ASTM method D 3175 and is the weight loss (minus the moisture) in percent of the carbon-containing material after heating to 950° C. ± 20° C. and being held at at that temperature for several minutes. Although the effect of volatile matter in the additive on the properties of the cement mass is not fully understood, it is believed that the volatile matter can be vaporized at the temperatures to which the cement may be subjected in the well. The vaporized material apparently disrupts the cement structure and forms undesirable voids and pores in the cement mass which can lead to the eventual failure of the cement and thus offset any beneficial effects of the carbon-containing additive. Good results are achieved when the volatile material content is between about 1 and about 15 percent by weight of the additive. Preferably the carbon additive has a volatile carbon content between about 2 and 10 percent by weight.

The amount of carbon-containing additive utilized in the cement system of the present invention will depend primarily on the carbon content of the additive. The proportion of carbon additive in the cement system must be effective to impart to the finished and hardened cement mass, resistance to retrogression of the ultimate compressive strength and permeability due to the effects of high temperature, pessure and steam, but less than an amount which will result in a reduction of the ultimate physical properties of the cement mass or which otherwise interferes with the curing of the cement system. Good results are achieved when sufficient additive is admixed with the cement to provide in the cement system a minimum carbon content of about 0.02 weight percent based on the weight of the cement. The maximum amount of additive utilized in the cement system is not critical and will depend upon such factors as the nature and carbon content of the additive, the type of cement utilized, well depth, the desired setting and curing rate and the like, provided, however, that the additive is not present in sufficient quantities to adversely effect the ultimate properties of the concrete mass. Normally, less than about 20 weight percent of additive is used in the cement system and excellent results are achieved when the additive comprises between about 5 and about 20 weight percent of the cement system. The preferred cement system contains between about 6 and about 15 weight percent of the carbon-contaning additive.

As previously mentioned the carbon content of the additive can vary considerably, ranging from a low carbon burned oil shale to mature coals and coke. The non-fixed carbon portion of the additive must not interfere with the setting, curing and ultimate properties of the cement mass. Consequently the volatile matter must be low, preferably between about 1 and about 15 weight percent of the additive and the non-carbon, non-volatile material is preferably inert with respect to the cement. In many cases the non-carbon, non-volatile components of the additive are siliceous or clayey type materials which may be beneficial in the cement mass.

Among those additives highly preferred for use in the present invention both because of the desired effect on the set and hardened cement and also because of their relatively low cost are anthracite, calcined coke, green coke, raw oil shale and burned oil shale. These additives, when added to cement in amounts equivalent to at least about 0.02 weight percent of carbon based on the weight of cement, are effective in improving the resistance of the set and hardened cement system to the effects of high temperature. These additives, in finely divided form, are preferably admixed with the dry cement prior to forming the cement slurry although the additive may be introduced at the point of use by dry mixing with the cement or wet mixing in the cement slurry. The particle size of the additive is not deemed critical although good results have been achieved when the additive has a particle size ranging between about 12 mesh and about 40 mesh in the U.S. Sieve series.

The coke and anthracite additives typically comprise between about 87 weight percent and about 95 weight percent of fixed carbon and typically less than about 8 weight percent of volatile material. Raw and burned oil shales, on the other hand, contain a much lower portion of fixed carbon (on the order of 10 to 30 and 3 to 4 weight percent, respectively) while the major portion is a combination of calcite, dolomite and silicerous materials. Burned oil shale is the shale recovered after thermal treatment of raw oil shale to extract the petroleum content thereof.

The choice of cement used in the cement system is dependent upon the desired ultimate physical properties of the set, hardened cement and the environment in which the cement is to be utilized. Normally, however, the cement will be a Portland-type oil well cement of one of the classes and types specified by The American Petroleum Institute (API) specification 10A. Depending on the well depth and environment in which the cement is to be used, it will be selected from one of the API classes A through J and will be formulated as an ordinary, moderate sulfate resistant, or high sulfate resistant type cement. The basis for selection of a particular class and type of cement for use in the cement system is well understood by those skilled in the art and is dependent, among other things, upon the depth at which the cement is intended to be used, the desired physical requirements and the chemical environment to which the cement mass is to be subjected. In addition, curing time is an important factor in selecting a particular class and type of cement. Typically, the cement utilized in the present invention will be class J which is formulated for oil well use at depths of from about 12,000 to 16,000 ft. under conditions of high temperature and pressure.

Besides the oil well cements discussed above, other types of cements, including conventional Portland construction cement, can also be utilized in the cement system of the present invention. For example, high alumina and pozzolan type cements, which are also noted for high temperature resistance and high durability under severe environments, for example contact by sea water, are useful. In addition, cements comprising mixtures of Portland cement and pozzolans or fly ash are also excellent cements for use in geothermal wells and the like.

The cement system of the present invention may also include any of the conventional additives utilized to alter the setting, curing or physical properties of the cement. These additives are used in the proportions ordinarily specified for conventional cement systems. For example, various retarders may be added to the cement composition to retard the setting of the cement thereby to render the cement slurry pumpable for a longer period of time than would be the case if no additives were used. Retarders are well-known in the art and do not per se form a part of the present invention, although for example, typical retarders include free lime, calcium sulfate (as gypsum or plaster of Paris), starches, cellulose products, sugars and the like.

Other additives include the so-called dispersing agents which aid in the workability of the cement slurry. Among such additives are surface active materials such as alkali salts of sulfonated fatty alcohols, salts of sulfonated hydrocarbons and fatty acids, carbohydrate salts and non-ionic surfactants such as the condensates of ethylene oxide with substituted phenols. These additives aid workability by permitting a reduction in the water-cement ratio, effect greater dispersion of the cement or effect air entrainment, all of which aid in the workability of the cement slurry.

Other additives include the water loss preventatives such as for example methyl hydroxy cellulose and ethyl hydroxy cellulose, which serve to prevent separation of the slurry water during pumping and setting of the cement.

In the utilization of the cement system of the present invention, the cement system, including cement and carbon additive, is preferably admixed with a suitable liquid vehicle to form a pumpable slurry. Water is required to hydrate the cement and therefore a water-containing liquid is required. In the following examples the slurry is a water slurry. As mentioned, however, oil/water mixtures can also be used.

In preparing cement slurries utilizing the cement system of the present invention the percent of water by weight of cement will typically range from between about 38 to about 46 percent to form a slurry of pumpable consistency. The slurry thus formed is pumped in conventional fashion into the portion of the well to be cemented. It should be clear, however, that greater or lesser amounts of liquid may be used depending upon the desired consistency and density of the slurry as determined by the method of transporting and placing the slurry in position.

The cement system of the invention is useful in all cementing operations in a well wherein low permeability and high compressive strength of the hardened cement mass are required. In general, the cement slurry is pumped through the well into an enclosed or confined space communicating with the well and therein allowed to cure into a hardened mass. Specifically, the cement system of the present invention will find utility in the well cementing operations as follows:

"Primary Cementing" is the method by which a well casing or liner is cemented in position in a well. The casing is positioned in the well to define a confined annular space between the casing and the walls of the bore hole. A cement slurry is then introduced into this confined space either at the top of the well or, more conventionally, by displacement from the bottom of the well. The slurry is allowed to cure into a solid mass which supports and reinforces the casing and prevents fluid communication between fluid-bearing zones;

"Squeeze cementing" is a method by which a defect in the primary cement job or some other localized problem in the well is remedied. Squeeze cementing is often used to seal off a water producing zone from an oil well. The portion of the well bore containing the defect is isolated, such as with a pair of inflatable packers, and the cement slurry is "squeezed" through a perforation or other hole in the well lining into the confined space to be plugged. The slurry is alowed to cure into a solid mass which seals the defect; and "Plugging back" is a method by which the lowest section of the well is permanently sealed. A well might be plugged back before abandonment, to seal off a water-bearing formation underlying a hydrocarbon-bearing zone, or to allow a directional well to be drilled from a window cut in an intermediate portion of the original well. A cement slurry is introduced into the bottom of the well up to the desired depth and allowed to cure into a solid mass which seals off that portion of the well.

In any case, the cement slurry is formed by admixing the oil well cement, the carbon-containing additive and the liquid vehicle in any order. The slurry thus formed is introduced into a confined or restricted space wherein it is allowed to set and harden. The cement system of the present invention is especially suitable for applications in which the cement slurry is allowed to cure under high temperature and pressure conditions.

The following examples illustrate some preferred cement systems utilizing a carbon additive in accordance with the present invention. The resistance to thermal degradation achieved using the carbon-containing additive is also demonstrated. The examples, however, are not intended as limiting the scope of the invention as defined by the appended claims.

EXAMPLE –5

Test cement systems using API class J cement manufactured by the Universal Atlas Cement Company and distributed under the trademark "Unadeep" are prepared by dry mixing the cement and various carbon-containing materials as high temperature additives. The additives include anthracite, coke calcined at 2500° F. and uncalcined coke. The cement additives are ground to a particle size of about 12 mesh to about 20 mesh (U.S. Sieve Series). Slurries are formed from the cement systems by the addition of water in an amount equal to 47 percent by weight of the cement. In addition a neat cement slurry is formed using only the class J cement and 47 weight percent water. The ingredients and proportions for each of the cement systems are summarized below:

| Compositions | Proportions | | | | |
|---|---|---|---|---|---|
| | Ex. 1 | Ex. 2 | Ex. 3 | Ex. 4 | Ex. 5 |
| Cement (API Class J) | 470g | 428g | 470g | 470g | 470g |
| Anthracite | 30g | 55g | — | — | — |
| Calcined coke | — | — | 50g | — | — |
| Uncalcined Coke | — | — | — | 50g | — |
| Water Loss Inhibitor[a] | 4.7 | 2.14 | 4.7 | 4.7 | 4.7 |
| Slurry Density g/ml | 2.66 | 2.29 | 2.00 | 2.10 | 1.84 |

[a]Methyl hydroxycellulose

Each of the slurries is poured into a mold, the cavity of which defines a cube having two inch faces. The mold is filled to overflowing and leveled off with a straight edge and the mold opening is sealed with a metal plate. The slurry containing mold is then placed in an autoclave and maintained at a temperature between 200 and 300° F. at 3000 psi for 24 hours in order to cure the slurry into a hardened cube. At the end of 24 hours the plate is removed from the molds and the cement cubes removed.

Each cube is tested for heat and steam resistance in an autoclave maintained at 464° F. through which steam is continuously circulating. The steam is derived from water obtained from a geothermal well in California. The tests are conducted for 3 months, at the end of which period the cube is removed and the permeability, density and compressive strength measured. The compressive strength tests are conducted in accordance with API specification RP 10B, section 6, on a 1 inch diameter by 1 inch long core removed from the cube. The permeability tests are conducted utilizing a gas permeameter which consists of a pressure plate and o-ring which are sealed against a face of the core and which is connected to a source of gas under pressure. The gas is introduced into the pressure chamber formed between the pressure plate and the face of the core and the rate of pressure drop is measured. The pressure drop rate is then converted to permeability in millidarcies.

The results of the compressive strength tests and the permeability tests are summarized in Table A below.

TABLE A

| | Compressive Strength psi | | Permeability md | |
|---|---|---|---|---|
| | Before Exposure | After 3 Mos. Steam Exposure | Exposure | After 3 Mos. Steam Exposure |
| Ex. 1 | about 3000 psi | 4750 | <1 | <1 |
| Ex. 2 | about 3000 psi | 4920 | <1 | <1 |
| Ex. 3 | about 3000 psi | 6620 | <1 | <1 |
| Ex. 4F | about 3000 psi | 6340 | <1 | <1 |
| Ex. 5 | about 2000 psi | 2125 | <1 | 31.5 |

It is generally recognized throughout the field of cementing wells that the maximum acceptable permeability of an oil well cement mass is about 1 millidarcy and the minimum acceptable compressive strength is about 1000 to 2000 psi. All of the cubes, regardless of the cement system from which they are formed, have a permeability of less than about 1.0 millidarcies prior to the initiation of the steam tests. From the results summarized above it can be seen that the cement sytems including carbon-containing additives form cement masses which exhibit substantially no measurable permeability. The neat cement system shows a substantial retrogression in permeability. With the higher rate of permeability, there is a substantially greater chance that the cement system of Example 5 will fail before the systems of Examples 1 through 4. Likewise, while the compressive strength of all of the cement systems increases with age, the strengths of the cubes formed from the systems of Examples 1 through 4 average an 88.5 percent increase after three months as compared to the 6 percent increase of the neat cement system of Example 5.

EXAMPLES 6-7

Cubes having two-inch faces are prepared and tested in the same manner as described above in connection with Examples 1 through 5. The cement systems are made up of the class J cement, the water-loss inhibitor and a carbon-containing additive in the same proportions as in Examples 3 and 4 except that the carbon-containing additive in Example 6 is burned oil shale having a particle size of between 20 and 40 mesh. The additive in Example 7 is burned shale having a particle size of between 12 and 20 mesh. The burned shale is prepared from oil shale which has been heated to a temperature of 500° C. to extract the oil and gas therefrom. The burned oil shale has a fixed carbon content of about 4 weight percent and the volatile material comprises less than 15 weight percent.

The cubes are subjected to 3 months of exposure to the geothermal steam and tested for permeability and compressive strength as in Examples 1 through 5. The results are summarized in Table B below:

TABLE B

| Additive | Compressive Strength (psi) | | Permeability (md) | |
|---|---|---|---|---|
| | Before Exposure | After Exposure | Before Exposure | After Exposure |
| Ex. 6 Burned Oil Shale (20-40 Mesh) | 3000 | 6670 | <1 | <1 |
| Ex. 7 Burned Oil Shale (12-20 Mesh) | 3000 | 6299 | <1 | <1 |

From the foregoing it is seen that the difference in particle size of the carbon-containing additive had little or no effect on permeability or compressive strength of the cement after three months at high temperatures.

EXAMPLES 8-10

Thermally resistant cement systems are subjected to well simulation tests in accordance with the following procedure.

0.25 inch diameter tubing prepared from J-55 casing steel is disposed in a 2 inch bore hole cut into a 6 inch Berea sandstone cube to simulate an oil well casing in a bore hole. The annular space between the walls of the bore hole and the tubing is filled with a cement slurry which is then permitted to set and cure under a gradually increasing temperature (80° F. to 464° F. over 4 hours) to simulate the temperature change which occurs during the pumping of a cool cement slurry into a high temperature well. This is carried out in an autoclave constructed for the purpose through which the geyser steam of Examples 1 through 5 is circulated. Once at temperature the sample is maintained in the interior of the autoclave at a temperature of about 460°

F. for three months. At the completion of the three months period the autoclave is slowly cooled and the tubing and concrete mass are removed from the rock cube for testing the permeability and compressive strength in accordance with procedures set forth in Examples 1 through 5.

Water slurries prepared for testing included; neat cement of the class J type (Example 8), class J cement and anthracite (Example 9) and class J cement and finely divided mica (Example 10). The composition of the slurries and the test results after 3 months exposure to the high temperatures of the test are summarized in Table C below.

TABLE C

| | Cement (API Class J) | Additive | Slurry Density Water lb/gal | Permeability md | Compressive Strength psi |
|---|---|---|---|---|---|
| Ex. 8 | 250 | — | 14.9 | 31.0$_c$ | 1340 |
| Ex. 9 | 250 | 39.9 lbs (anthracite) | 14.9 | <1 | 6670 |
| Ex. 10 | 250 | 26.6 lbs (mica)$^b$ | 14.3 | 23$^c$ | 1260 |

$^b$Mica prepared for addition to drilling fluids by The Baroid Division, National Lead Company and marketed under the trademark MicaTex.
$^c$Fails to meet recognized standard.

EXAMPLES 11–17

Cubes having two-inch faces are prepared and tested in the same manner as described above with respect to Examples 1 through 5. The cement systems are made up of API class G cement and varying amounts of anthracite.

The cubes are subjected to 3 months of exposure to 464° F. geothermal steam and tested for permeability and compressive strength as in Examples 1 through 5. The results are summarized in Table D below.

TABLE D

| Ex. No. | Weight Percent of Solids | | Compressive Strength, psi | Permeability Millidarcies |
|---|---|---|---|---|
| | Cement | Anthracite | | |
| 11 | 90.9 | 9.1 | 2400 | <1 |
| 12 | 90.9 | 9.1 | 2350 | <1 |
| 13 | 83.4 | 16.6 | 1775 | <1 |
| 14 | 66.7 | 33.3 | 800$^c$ | <1 |
| 15 | 62.5 | 37.5 | 790$^c$ | 6.4$^c$ |
| 16 | 58.8 | 41.2 | 670$^c$ | <1 |
| 17 | 50.0 | 50.0 | 500$^c$ | 7.7$^c$ |

$^c$Fails to meet recognized standard.

As is apparent from Table D, those cement systems containing more than 20 weight percent of anthracite (Examples 14 through 17) failed to meet one or both the recognized standards, whereas the cement systems of this invention (Examples 11 through 13) meet both these standards.

EXAMPLES 18–27

Cubes having two-inch faces are prepared and tested in the same manner as described above with respect to Examples 1 through 5. The cement systems are made up of API Class J cement, 1 weight percent carboxymethyl cellulose as a water loss inhibitor, and a carbon-containing additive (except Example 27 which contains 9.1 weight percent Mica).

The cubes are subjected to 2 months of exposure to 464° F. geothermal steam and tested for permability and compressive strength as in Examples 1 through 5. The results are summarized in Table E below:

TABLE E

| Ex. No. | Weight Percent of Solids | | Compressive Strength, psi | Permeability Millidarcies |
|---|---|---|---|---|
| | Cement | Carbon Additive | | |
| 18 | 93.4 | 5.6 Anthracite | 5000 | <1 |
| 19 | 87.5 | 11.5 Anthracite | 5500 | <1 |
| 20 | 78.6 | 20.4 Anthracite | 3000 | 2.8$^c$ |
| 21 | 89.9 | 9.1 Lignite$^d$ | 2000 | 2.8$^c$ |
| 22 | 78.6 | 20.4 Lignite$^d$ | 1100 | 4.6$^c$ |
| 23 | 89.9 | 9.1 Green Coke | 3680 | <1 |
| 24 | 89.9 | 9.1 Raw Oil Shale | 4700 | <1 |
| 25 | 89.9 | 9.1 Burnt Oil Shale | 5500 | <1 |
| 26 | 89.9 | 9.1 Calcined Coke | 6000 | <1 |
| 27 | 89.9 | | 1500 | 4.5$^c$ |

$^c$Does not meet recognized standards.
$^d$Lignite has a volatile material content of between 45 and 60 percent.

The cement systems of Examples 18, 19 and 23 through 26 which are within the scope of this invention exceed the recognized standards whereas the cement systems of examples 20 through 22 and 27, which are outside the scope of this invention, failed to meet these standards.

From the foregoing it has been shown that cement systems including a carbon-containing additive in accordance with the present invention demonstrate a resistance to degradation of permeability and a relatively greater compressive strength after exposure to high temperatures and steam as compared to cement systems without the carbon-containing additives and cement systems with carbon-containing addition which are outside the scope of this invention. Consequently the cement systems of the invention are particularly well suited for use in deep wells and geothermal wells where high temperatures are to be encountered. While the foregoing examples have demonstrated cement compositions using API class J cement and API class G cements, it should be clear that other types and classes of cement may be used in the cement systems of the invention. Also, while the cement system has been described herein in connection with use as an oil well cement, the cement system of this invention will find use in other high temperature environments where resistance to degradation of strength and permeability are important, such as in furnaces, reactors and the like.

The cement systems of the present invention are preferably premixed at the point of manufacture so that the necessity of handling separate additives and the attendant increase in labor costs and the like is avoided.

While particular embodiments of the invention have been described it will be understood, of course, that the invention is not limited thereto since many obvious modifications can be made, and it is intended to include within this invention any such modification as will fall within the scope of the appended claims.

I claim:

1. A cement system which upon hydration and curing forms a hardened cement mass, said cement system consisting essentially of cement and an effective amount, less than 20 weight percent of said cement system, of a carbon-containing cement additive selected from the group consisting of anthracite, calcined coke, uncalcined coke, raw oil shale and burned oil shale, said cement additive having between about 1 and about 15 weight percent volatile material, said amount being effective to impart to said cement mass an ultimate compressive strength of at least about 1000 p.s.i. and an ultimate permeability less than about 1 millidarcy when exposed to high temperatures.

2. The cement system of claim 1 wherein said cement additive is present in an amount sufficient to provide at least about 0.02 weight percent carbon in said cement system.

3. The cement system of claim 1 wherein said cement additive has a volatile material content of between about 2 and about 10 eight percent.

4. The cement system of claim 1 wherein said cement additive comprises at least about 5 weight percent of said cement system.

5. The cement system of claim 4 wherein said cement additive comprises between about 6 and about 15 weight percent of said cement system.

6. The cement system of claim 1 wherein said cement is selected from the group consisting of Portland cement, pozzolan cement, high alumina cement and mixtures thereof.

7. The cement system of claim 1 wherein said cement is an oil well cement selected from the group consisting of API Class G cement and API Class J cement.

8. The cement system of claim 1 admixed with a water-containing liquid vehicle to form a slurry of pumpable consistency.

9. The cement system of claim 8 wherein said liquid vehicle is selected from the group consisting of water and mixtures of water and a liquid hydrocarbon.

10. A cement system consisting essentially of oil well cement and from about 6 to about weight percent of a carbon-containing cement additive selected from the group consisting of anthracite, calcined coke, uncalcined coke, raw oil shale and burned oil shale, said cement additive having a volatile material content of between about 2 and about 10 weight percent.

11. The cement system of claim 10 wherein said oil well cement is selected from the group consisting of Portland cement, pozzolan cement, high alumina cement and mixtures thereof.

12. The cement system of claim 10 admixed with a water-containing liquid vehicle to form a slurry of pumpable consistency.

13. The cement system of claim 10 comprising from about 84 to about 93 weight percent of said oil well cement, from about 6 to about 15 weight percent of said cement additive and about 1 weight percent of a water loss inhibitor.

14. A cement system consisting essentially of an oil well cement selected from the group consisting of API Class G cement and API Class J cement, and from about 6 to about 15 weight percent of a carbon-containing cement additive selected from the group consisting of anthracite, calcined coke, uncalcined coke, raw oil shale and burned oil shale, said cement additive having a volatile material content of between about 2 and about 10 weight percent.

15. A hardened cement mass having improved resistance to degradation of its ultimate permeability and compressive strength when exposed to high temperatures, which cement mass is prepared by the method comprising:

forming a hardenable slurry consisting essentially of a cement system and a water-containing liquid vehicle, said cement system consisting essentially of cement and from about 6 to about 15 weight percent of a carbon-containing cement additive selected from the group consisting of anthracite, calcined coke, uncalcined coke, raw oil shale and burned oil shale, said cement additive having a volatile material content of between about 1 and about 15 weight percent; and curing said hardenable slurry to form said cement mass.

16. Th cement mass of claim 15 wherein said cement is an oil well cement selected from the group consisting of API Clas G cement and API Class J cement.

17. The cement mass of claim 15 wherein said cement additive has a volatile material content between about 2 and about 10 weight percent.

18. The cement mass of claim 15 wherein said hardenable slurry is cured under high temperature and pressure conditions.

19. The cement mass of claim 15 wherein said hardenable slurry is introduced through a bore hole into a confined space in fluid communication with the bore hole and is therein allowed to cure to form said cement mass.

20. The cement mass of claim 19 wherein said hardenable slurry is cured under high temperature and pressure conditions.

21. The cement mass of claim 19 wherein said confined space is an annular space between the walls of the bore hole and a casing or liner disposed in the bore hole.

* * * * *

UNITED STATES PATENT AND TRADEMARK OFFICE
CERTIFICATE OF CORRECTION

PATENT NO. : 4,144,077
DATED : March 13, 1979
INVENTOR(S) : JULIUS P. GALLUS

It is certified that error appears in the above-identified patent and that said Letters Patent are hereby corrected as shown below:

In column 11, line 26 (claim 10), insert --15-- after "about" (second occurrence); and In column 12, line 25 (claim 16), change "Th" to read --The--, and in line 27 (claim 16) change "Clas" to read --Class--.

Signed and Sealed this

Twenty-second Day of May 1979

[SEAL]

Attest:

RUTH C. MASON
Attesting Officer

DONALD W. BANNER
Commissioner of Patents and Trademarks